(12) United States Patent
Borawski et al.

(10) Patent No.: US 12,149,783 B2
(45) Date of Patent: *Nov. 19, 2024

(54) METHODS AND APPARATUS TO CREATE CANDIDATE REFERENCE SIGNATURES FROM SIGNATURE FRAGMENTS

(71) Applicant: The Nielsen Company (US), LLC, New York, NY (US)

(72) Inventors: Albert T. Borawski, Oldsmar, FL (US); Geetanjali Arya, New York, NY (US); Satish Kumar Kukunuru, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,914

(22) Filed: May 12, 2023

(65) Prior Publication Data
US 2023/0283842 A1    Sep. 7, 2023

Related U.S. Application Data

(63) Continuation of application No. 17/515,160, filed on Oct. 29, 2021, now Pat. No. 11,683,561.

(51) Int. Cl.
*H04H 60/32* (2008.01)
*H04N 21/442* (2011.01)
*H04N 21/845* (2011.01)

(52) U.S. Cl.
CPC ... *H04N 21/44204* (2013.01); *H04N 21/8456* (2013.01)

(58) Field of Classification Search
CPC .............. H04N 21/44204; H04N 21/8456
See application file for complete search history.

(56) References Cited

U.S. PATENT DOCUMENTS

| 10,055,420 B1 | 8/2018 | Pogde et al. |
| 10,318,813 B1 | 6/2019 | Pereira et al. |

(Continued)

OTHER PUBLICATIONS

United States Patent and Trademark Office, "Non-Final Office Action," issued in connection with U.S. Appl. No. 17/515,160, dated Oct. 4, 2022, 9 pages.

(Continued)

*Primary Examiner* — Gigi L Dubasky

(57) ABSTRACT

Methods, apparatus, systems, and articles of manufacture to create a reference signature asset from matched signature fragments are disclosed. Example apparatus disclosed herein form a group of matched signature fragments corresponding to a same piece of media. Disclosed example apparatus also select a subset of matched signature fragments from the group to form a path of matched signature fragments that collectively represent a continuous segment of the piece of media, the continuous segment identified by a segment start time and a segment end time, the segment start time corresponding to a fragment start time associated with an initial matched signature fragment in the path, and the segment end time corresponding to a fragment end time associated with a last matched signature fragment in the path. Disclosed example apparatus further use the path to combine the subset of matched signature fragments and create a new reference signature asset.

20 Claims, 10 Drawing Sheets

(56) References Cited

U.S. PATENT DOCUMENTS

| | | |
|---|---|---|
| 10,579,668 B1 * | 3/2020 | Ramanathan ....... G06F 16/2255 |
| 10,915,260 B1 * | 2/2021 | Lei ....................... G06F 3/0671 |
| 11,445,242 B2 | 9/2022 | Stojancic et al. |
| 11,463,787 B1 | 10/2022 | Nelson et al. |
| 11,683,561 B2 * | 6/2023 | Borawski ......... H04N 21/23418 |
| | | 725/19 |
| 2009/0074235 A1 | 3/2009 | Lahr et al. |
| 2009/0154806 A1 | 6/2009 | Chang et al. |
| 2011/0022638 A1 | 1/2011 | Jiang |
| 2018/0005038 A1 | 1/2018 | Granstrom |
| 2018/0053039 A1 * | 2/2018 | Anders ................. G06V 20/48 |
| 2019/0058926 A1 | 2/2019 | Borawski et al. |
| 2020/0053827 A1 | 2/2020 | Chan et al. |
| 2020/0145721 A1 | 5/2020 | Tapse et al. |
| 2023/0138064 A1 | 5/2023 | Borawski et al. |
| 2023/0140350 A1 | 5/2023 | Borawski et al. |

OTHER PUBLICATIONS

United States Patent and Trademark Office, "Notice of Allowance and Fee(s) Due," issued in connection with U.S. Appl. No. 17/515,160, dated Feb. 6, 2023, 8 pages.

* cited by examiner

1

METHODS AND APPARATUS TO CREATE CANDIDATE REFERENCE SIGNATURES FROM SIGNATURE FRAGMENTS

CROSS REFERENCE TO RELATED APPLICATIONS

This patent arises from a continuation of U.S. patent application Ser. No. 17/515,160 (now U.S. Pat. No. 11,683, 561), which was filed on Oct. 29, 2021. U.S. patent application Ser. No. 17/515,160 is hereby incorporated herein by reference in its entirety. Priority to U.S. patent application Ser. No. 17/515,160 is hereby claimed.

FIELD OF THE DISCLOSURE

This disclosure relates generally to monitoring media using media signatures, and, more particularly, to methods and apparatus to create reference media signatures using fragments of media signatures.

BACKGROUND

Presentation of media to users can be monitored through the use of signatures for media identification. In some examples, signature-based media monitoring uses media signatures generated by a device meter to identify and track the media presented by a device. The meter signatures are compared against a database of reference (e.g., identified) media and their corresponding reference signatures. When a match is found between one or more reference signatures and one or more meter signatures, the media presented by the device can be identified based on the reference media information associated with the matching reference signature(s). Media signatures can take many forms (e.g., a series of digital values, a waveform, etc.), but are typically representative of some aspect of the monitored media signals.

Figure 1:
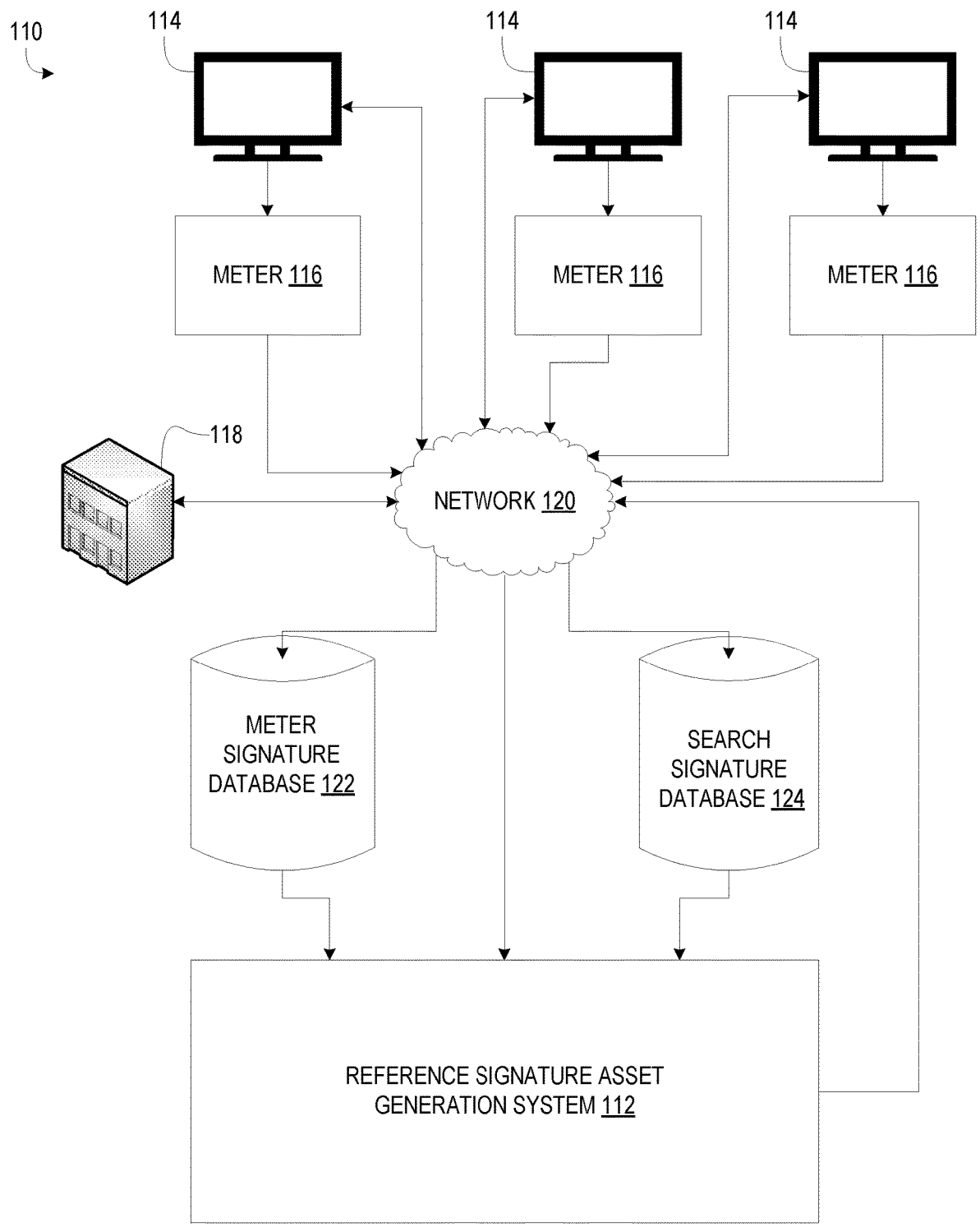
FIG. 1 is a block diagram of an example environment in which signature fragments are generated, stored, and used to create reference signatures in accordance with teachings of this disclosure.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Many entities have an interest in understanding how users are exposed to media on the Internet. For example, an audience measurement entity (AME) desires knowledge of how users interact with media devices, such as smartphones, tablets, laptops, smart televisions, etc., and/or media presented thereon. For example, an AME may want to monitor media presentations made at the media devices to, among other things, monitor exposure to advertisements, determine advertisement effectiveness, determine user behavior, identify purchasing behavior associated with various demographics, etc.

AMEs coordinate with advertisers to obtain knowledge regarding an audience of media. For example, advertisers are interested in knowing the composition, engagement, size, etc., of an audience for media. For example, media (e.g., audio and/or video media) may be distributed by a media distributor to media consumers. Content distributors, advertisers, content producers, etc. have an interest in knowing the size of an audience for media by the media distributor, the extent to which an audience consumes the media, whether the audience pauses, rewinds, fast-forwards the media, etc. In some examples, the term "content" includes programs, advertisements, clips, shows, etc., In some examples, the term "media" includes any type of audio and/or visual content and/or advertisement delivered via any type of distribution medium. Thus, media includes television programming and/or advertisements, radio programming and/or advertisements, movies, web sites, streaming media, etc. Unless context clearly dictates otherwise, for ease of explanation, "media" refers to a piece of media (e.g., movie, TV show, etc.) in its entirety.

In some instances, AMEs identify media by extracting media identifiers such as fingerprints, signatures, and/or media-identifying metadata, such as codes, watermarks, etc., and comparing them to reference media identifiers. For example, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A reference media signature may be a series of constituent media signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean any proxy for identifying media that is generated from one or more inherent characteristics of the media.

Signature-based media monitoring generally involves determining (e.g., generating or otherwise collecting) signature(s) representative of a media signal (e.g., an audio signal and/or a video signal) output by a monitored media device and comparing the collected signature(s) to one or more references signatures corresponding to known (e.g., reference) media sources. Various comparison criteria, such as a cross-correlation value, a Hamming distance, etc., can be evaluated to determine whether a collected signature matches a particular reference media signature. When a match between the collected signature and one of the reference media signatures is found, the monitored media can be identified as corresponding to the particular reference media represented by the reference media signature that matched the collected signature. Because attributes, such as an identifier of the media, a presentation time, a broadcast channel, etc., associated with the reference media signature are collected, these attributes may then be associated with the monitored media whose collected signature matched the reference media signature. Example systems for identifying media based on codes and/or signatures are long known and were first disclosed in Thomas, U.S. Pat. No. 5,481,294, which is hereby incorporated by reference in its entirety. For convenience, a "reference media signature" will henceforth be referred to as a "reference signature" unless otherwise specified.

As used herein, a reference signature asset refers to a sequence/string of signatures generated from a piece of media to represent at least some portion or fragment of the media. For example, a complete reference signature asset can be a sequence/string of signatures sufficient to represent a piece of media in its entirety (e.g., from the start to the end of the piece of media). In some examples, a piece of media may not yet be represented by a complete reference signature asset in a reference database. For example, an AME may not have a reference signature for a newly released song, a rare and/or old recording, a regional broadcast, user generated media, etc. However, in some such examples, the AME may have access to a search signature database, which includes signatures of portions of the piece of media, which are referred to herein as search signatures. In some examples, the search signature sequences/strings have known start and end times within the reference piece of media, and represent known lengths/portions of the reference piece of media that begin and end at those known start and end times.

Some prior signature-based media monitoring techniques create a reference signature asset for a particular piece of media by matching a complete signature asset to reference data, or matching multiple complete reference signature assets to each other until a "best" representative signature is found and selected to be the reference signature. In some such prior techniques, to identify a complete reference signature asset, a collected signature (e.g., collected by a meter and, thus, also referred to herein as a metered signature) is matched against search signature sequences/strings to identify fragment(s) of the collected signature, referred to as matched signature fragment(s), that match corresponding portions of the pre-existing reference data. In some examples, if the length of a matched signature fragment relative to the length of the media passes an example threshold, the fragment is considered a complete reference signature asset, and any matched signature fragment that does not pass the threshold is discarded. However, this can be inefficient, as computation time is spent matching signature fragments that are not ultimately considered as complete reference signature assets. AMEs seek to create a reference signature as soon as possible once a particular piece of media is available for viewing, so efficient computation as achievable through examples disclosed herein is beneficial.

Example systems, methods, and apparatus disclosed herein utilize matched signature fragments that may otherwise be discarded. In some such examples, when a match is found between a search signature fragment and a meter-generated signature fragment, the matched signature fragment is added to a group of candidate signature assets corresponding to the reference media represented by the search signature fragment that matched the meter-generated signature fragment. In some examples, a subset of the candidate signature assets in the group of candidate signature assets are selected and ordered into one or more valid paths. The matched signature fragments of each valid path are stitched together to form a signature that is continuous and meets an example length threshold sufficient to be considered a complete signature fragment. By utilizing discarded matched signature fragments, the example complete reference signature asset circuitry creates complete signature fragments with increased efficiency. The increased complete signature fragment creation efficiency may result in both increased computational efficiencies, and AMEs selecting a "best" representative signature more efficiently.

FIG. 1 is a block diagram of an example environment 110 in which an example reference signature asset generation system 112 constructed in accordance with teachings of this disclosure operates to generate complete signature fragments from meter signatures. The complete signature fragments are generated to be representative of reference media that have search signature fragments that are available in an example search signature database 124. A search signature sequence, also referred to as a search signature string, is a set of temporally related (e.g., sequential) search signatures that correspond to a fragment of a complete signature fragment that can be used to match against meter signatures to potentially identify the media corresponding to the meter signatures. The search signature sequence is accompanied by metadata that describes the position of the search signature sequence within the reference media or, in other words, the portion of the reference media represented by the search signature sequence. In some examples, the metadata includes the start time of the search signature sequence within the reference media, the end time of the search signature sequence within the reference media, and the length (e.g., overall duration) of the reference media. In some examples, the end time of the search signature sequence within the reference media is omitted in favor of a length (e.g., duration) of the portion (e.g., fragment) of the piece of reference media represented by the search signature sequence, or vice versa.

The example environment 110 includes the example reference signature asset generation system 112, one or more example client devices 114, one or more example meters 116, an example central facility 118, an example network 120, an example meter signature database 122, and an example search signature database 124. In the illustrated example of FIG. 1, the client devices 114 can correspond to any media device, such as televisions, smartphones, radios, computers, laptops, music players, disc readers, streaming media receivers, etc. Although the example environment 110 is illustrated as including multiple client devices 114 and meters 116, in some examples the environment 110 may include one client device 114 and one meter 116.

According to the illustrated example, the example reference signature asset generation system 112, the client devices 114, the meters 116, the central facility 118, the meter signature database 122, and the search signature database 124 are interconnected via the example network 120. Each example client device 114 is transmissibly coupled to one example meter 116 (e.g., wired, over Wi-Fi, over Bluetooth®, etc.). The example client device 114 receives network distributed media via the network 120. In some examples, the example reference signature asset generation system 112 is located at the central facility 118. However, in some examples, the example reference signature asset generation system 112 is located at a remote location from the central facility 118.

The example meters 116 generate signatures, referred to herein as meter signatures, representative of the media presented on the client devices 114. Based on the sampling rate of the example meter 116 and the length of time for which the media was presented and monitored by the meter 116, the signatures are generated as sequences/strings of individual signatures. For example, where the meter 116 has a sampling rate of three signatures per second and a piece of media is presented for one minute, a string of 180 individual signatures representative of the piece of media are generated by the meter 116. Further, the example meters 116 generate the same, or similar, signature strings for the same piece of presented media. For example, a first meter coupled to a first client device presenting a movie in Montana at 11:00 AM on a Saturday may generate the same (or similar, e.g., depending on background noise, client device characteristics, etc.) signature string as a second meter coupled to a second client device presenting the same movie in Illinois at 8:00 PM on a Wednesday. Signature strings are described further in the context of FIG. 5. The example meter 116 relays the signature strings to the example meter signature database 122 via the example network 120. The terms "signature string", "signature sequence", and "sequence of signatures" is hereby used interchangeably within.

In operation, when media is presented to users by the example client devices 114, the example meters 116 generate meter signature sequences/strings representative of the media and report (e.g., transmit) the meter signature strings to the example meter signature database 122. The example reference signature asset generation system 112 receives the meter signature strings from the example meter signature database 122 and attempts to match segments of the meter signature strings to search signature sequence(s) stored in the example search signature database 124. Using the results of these matches, the reference signature asset generation system 112 generates reference signature assets for a given piece of reference media from the meter signature sequences/strings determined to match the search signature sequence(s)/string(s) corresponding to that reference media, and provides the complete signature fragments to the central facility 118. At the central facility 118, the complete signature fragments may be compared with each other and with other complete signature fragments to select a representative reference signature asset to be used to identify that reference media.

The example reference signature asset generation system 112 queries the example meter signature database 122 to determine which meter signature sequence/string to send to the example reference signature asset generation system 112. The example reference signature asset generation system 112 can employ any ordering technique to select meter signature strings, but in some examples, the example reference signature asset generation system 112 is configured to select the meter signature strings based on a priority of the meter signature sequences/strings. This priority can be determined through one or more factors, including, but not limited to, the time a meter signature sequence/string was generated, the source that generated a meter signature sequence/string, any associated metadata, and example client device 114, etc.

The example reference signature asset generation system 112 queries the example search signature database 124 to determine which search signature sequence/string to send to the example reference signature asset generation system 112. The example reference signature asset generation system 112 can employ any ordering technique to select search signature sequences/strings, but in some examples, the example reference signature asset generation system 112 is configured to select the search signature sequences/strings to expedite matching. In one example, one or more search signature sequences/strings may be prioritized over others at certain times in the day. In some examples, one or more search signature sequences/strings are prioritized when it is known that a certain event draws a lot of viewers (e.g., Super Bowl, the Oscars, etc.). In some examples, if it is determined that a search signature sequence/string will not be able to find a reference signature asset at any point in the process, it may not be selected for optimization of the system.

Figure 2:
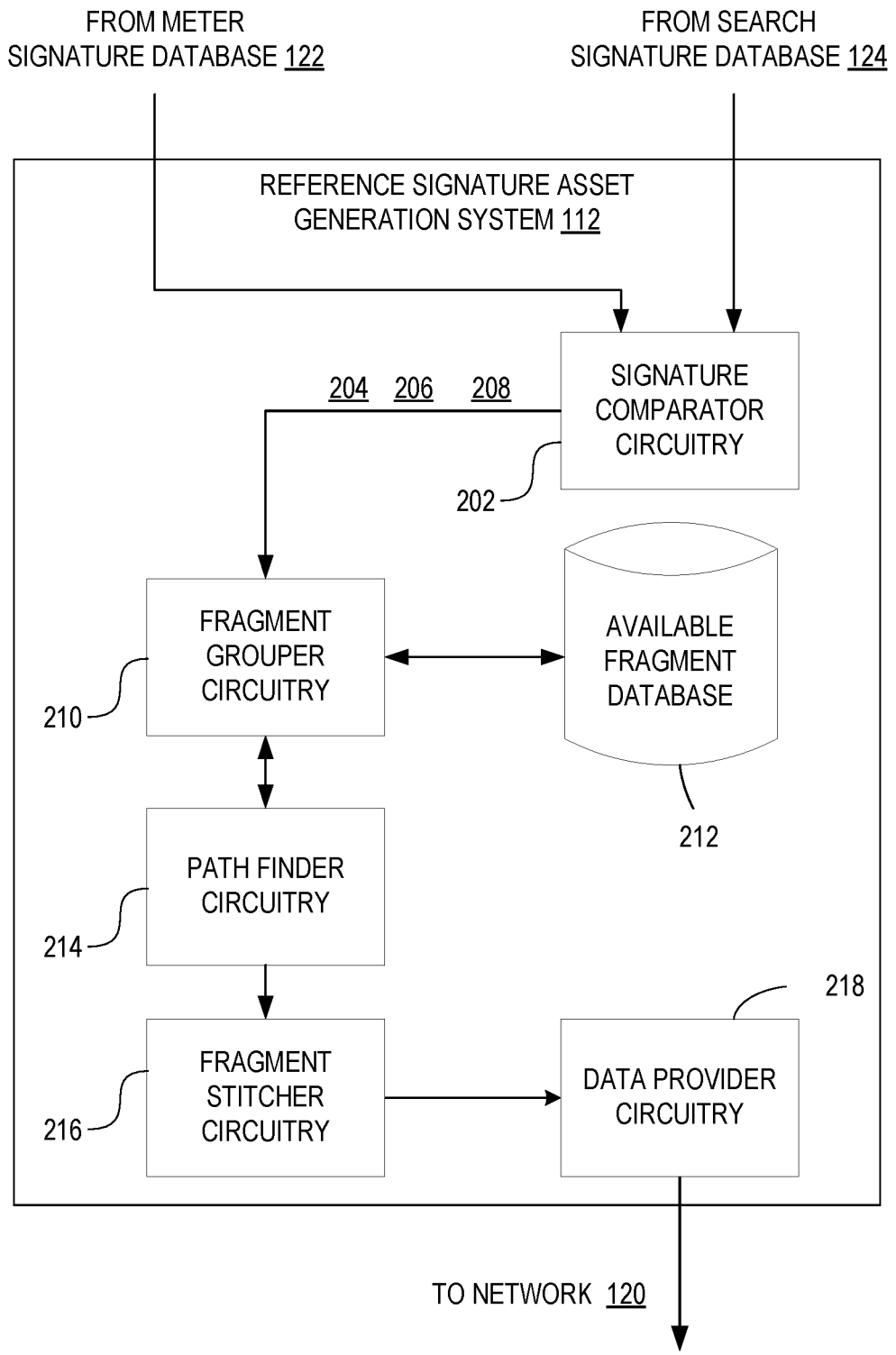
FIG. 2 is a block diagram of the example reference signature asset generation system included in the example environment of FIG. 1.

FIG. 2 is a block diagram of an example implementation of the example reference signature asset generation system 112 of the example environment of FIG. 1. The example reference signature asset generation system 112 includes example signature comparator circuitry 202, example fragment grouper circuitry 210, an example available fragment database 212, example path finder circuitry 214, example fragment stitcher circuitry 216, and example data provider circuitry 218.

In the illustrated example, the signature comparator circuitry 202 compares meter signature sequences/strings from the example meter signature database 122 with search signature sequences/strings from the example search signature database 124. When the signature comparator circuitry 202 finds a match between a search signature sequence/string and a meter signature sequence/string, the example signature comparator circuitry 202 sends the matched signature fragment 204 (e.g., which corresponds to the particular search signature sequence/string that matched the meter signature sequence/string), media metadata 206, and fragment metadata 208 to the example fragment grouper circuitry 210.

The media metadata 206 identified by the signature comparator circuitry 202 is associated with the search signature sequence/string corresponding to the matched signature fragment 204 and is obtained from the example search signature database 124. In the illustrated example, the media metadata 206 contains information describing media represented by the search matched signature sequence/string corresponding to the matched signature fragment 204. For example, the media metadata 206 can include a title of the media and the length of the media. In some examples, the media metadata 206 may name the source of the media. This source may provide media through a streaming platform or a live television broadcast. Example media sources include but are not limited to NETFLIX®, HULU®, DISNEY+®, YOUTUBE®, NBC®, CBS®, PBS®, etc. In some examples, the media metadata 206 may contain an episode title, episode number, episode length, season number, show title, and media source. In some examples, the media metadata 206 may contain the title of a movie, comedy special, or musical, the length of the movie, comedy special, or musical, and media source.

The fragment metadata 208 identified by the example signature comparator circuitry 202 further describes the matched signature fragment 204. For example, the fragment metadata 208 describes a fragment start time, fragment end time, and total length of the search signature sequence/string and, by association, the matched signature fragment 204 relative to the media that it represents. For example, if an example matched signature fragment 204 has associated fragment metadata 208 of (45, 200, 155), then the first signature position of the matched signature fragment 204 represents the audio/visual data at 45 seconds from the start of the matched media.

Similarly, the last signature position of the matched signature fragment 204 represents the audio/visual data at 200 seconds from the start of the matched media. Additionally, the total length of 155 indicates that the entirety of the signature sequences/strings included in the example matched signature fragment 204 represents 155 seconds of audio/visual data from the matched media. In some examples, the fragment metadata 208 may be represented as an ordered triplet of numbers, e.g., (fragment start time, fragment end time, total length), with each value in units of seconds or some other units of duration.

In some examples, the example reference signature asset generation system 112 includes means for comparing meter signature sequences/strings. For example, the means for comparing may be implemented by the example signature comparator circuitry 202. In some examples, the example signature comparator circuitry 202 may be implemented by machine executable instructions such as that implemented by at least blocks 302 of FIG. 3 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the example signature comparator circuitry 202 is implemented by other hardware logic circuitry, hardware implemented state machines, and/or any other combination of hardware, software, and/or firmware. For example, the example signature comparator circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example fragment grouper circuitry 210 of FIG. 2 receives the media metadata 206 and fragment metadata 208 identified by the signature comparator circuitry 202. The example fragment grouper circuitry 210 determines if there are any other matched signature fragments in the example available fragment database 212 having media metadata that matches the media metadata 206 of the matched signature fragment 204 received from the signature comparator circuitry 202.

If there are any matched signature fragments in the example available fragment database 212 that match the media metadata 206, the example fragment grouper circuitry 210 obtains the matched signature fragments from the example available fragment database 212 and uses them to form a group with the matched signature fragment 204 received from the signature comparator circuitry 202. For example, if an example matched signature fragment 204 received from the signature comparator circuitry 202 has media metadata 206 for the movie Frozen®, then any matched signature fragment in available fragment database 212 with media metadata 206 for the movie Frozen® will be obtained from the database and added to a group. Additionally, some matched signature fragments 204 may be used by the example reference signature asset generation system 112 multiple times. In some examples, each matching signature fragment 204 stored in the available fragment database 212 is associated with a respective index that describes how many times a given matched signature fragment 204 has been used previously. In some examples, the index is stored in the example available fragment database 212 and remains associated with the corresponding matched signature fragment 204 when it joins the group. If there are no matched signature fragments 204 in the example available fragment database 212 that match the media metadata 206, the example fragment grouper circuitry 210 forms a group with the one matched signature fragment 204 from the signature comparator circuitry 202.

In some examples, the example reference signature asset generation system 112 includes means for forming a group of matched signature fragments corresponding to the same piece of media. For example, the means for forming may be implemented by the example fragment grouper circuitry 210. In some examples, the example fragment grouper circuitry 210 may be implemented by machine executable instructions such as that implemented by at least blocks 304 of FIG. 3 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the example fragment grouper circuitry 210 is implemented by other hardware logic circuitry, hardware implemented state machines, and/or any other combination of hardware, software, and/or firmware. For example, the example fragment grouper circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example available fragment database 212 stores matched signature fragments 204 that are available for use in the formation of a reference signature asset. For some matched signature fragments 204, an index describing how many times the fragment has been used is also saved in the example available fragment database 212. The example available fragment database 212 is implemented by any memory, storage device and/or storage disc for storing data such as, for example, flash memory, magnetic media, optical media, solid state memory, hard drive(s), thumb drive(s), etc. Furthermore, the data stored in the example available fragment database 212 may be in any data format such as, for example, binary data, comma delimited data, tab delimited data, structured query language (SQL) structures, etc. While the example available fragment database 212 is illustrated as a single device in FIG. 2, the example available fragment database 212 and/or any other data storage devices described herein may be implemented by any number and/or type(s) of memories.

The example path finder circuitry 214 receives the group from the fragment grouper circuitry and attempts to form a valid path. In this example, a path is an ordered subset of matched signature fragments 204 from the group. The subset is in increasing order of the fragment start time listed in each matched signature fragment's fragment metadata 208, so the matched signature fragment 204 with the earliest fragment start time is ordered first and the matched signature fragment 204 with the latest fragment start time is ordered last.

In some examples, the example path finder circuitry 214 identifies a valid path that meets two conditions. In the illustrated example, the first condition is that the matched signature fragments 204 from the ordered subset collectively represent a continuous segment of the piece of media. This means that the fragment end time of the matched signature fragment with index i in the path is to be greater or equal to the fragment start time of the matched signature fragment with index i+1 in the path. For example, suppose a matched signature fragment 204 at index i in the path has a fragment end time of 00:45:00. A matched signature fragment 204 with a fragment start time of 00:45:30 may not be used next at index i+1 in the path, but a matched signature fragment with a fragment start time of 00:43:52 may be used next at index i+. The continuous segment is identified by a segment start time, which corresponds to a fragment start time associated with an initial matched signature fragment in the path, and a segment end time, which corresponds to a fragment end time associated with a last matched signature fragment in the path.

In the illustrated example, the second condition for a path to be valid is that the path percentage meets a threshold amount. In some examples, a path percentage is defined as the total length of the path divided by the total length of the media, where the total length of the path is defined as the difference between the segment end time and the segment start time of the entire path. For example, if an example segment start time of an example group for the movie Frozen® is at 00:01:45 (formatted as hh:mm:ss) and an example segment end time is at 01:47:21, then the path has a total length of 6384 seconds. This length is divided by the runtime of the movie Frozen®, 6540 seconds (01:49:00), for a path percentage of 97.6%. In the illustrated example, the example path finder circuitry 214 compares this path percentage against an example threshold amount to determine whether the example path is valid.

An example threshold amount may be any percentage between 0% and 100%. In some examples, the example threshold may be determined based on an expected length of end credits. For example, if a 30 minute television show shows end credits for the last minute, an example AME may set the example threshold at 96.67% to represent the first 29 minutes of the show. Similarly, if a movie lasts 2 hours in total, with 10 minutes of end credits, the example AME may set the example threshold at 91.67% the first 110 minutes of the movie. In other examples, the example AME does not specify example threshold amounts based on expected end credit length but instead selects a default threshold of 90%, 95%, etc.

Figure 6:
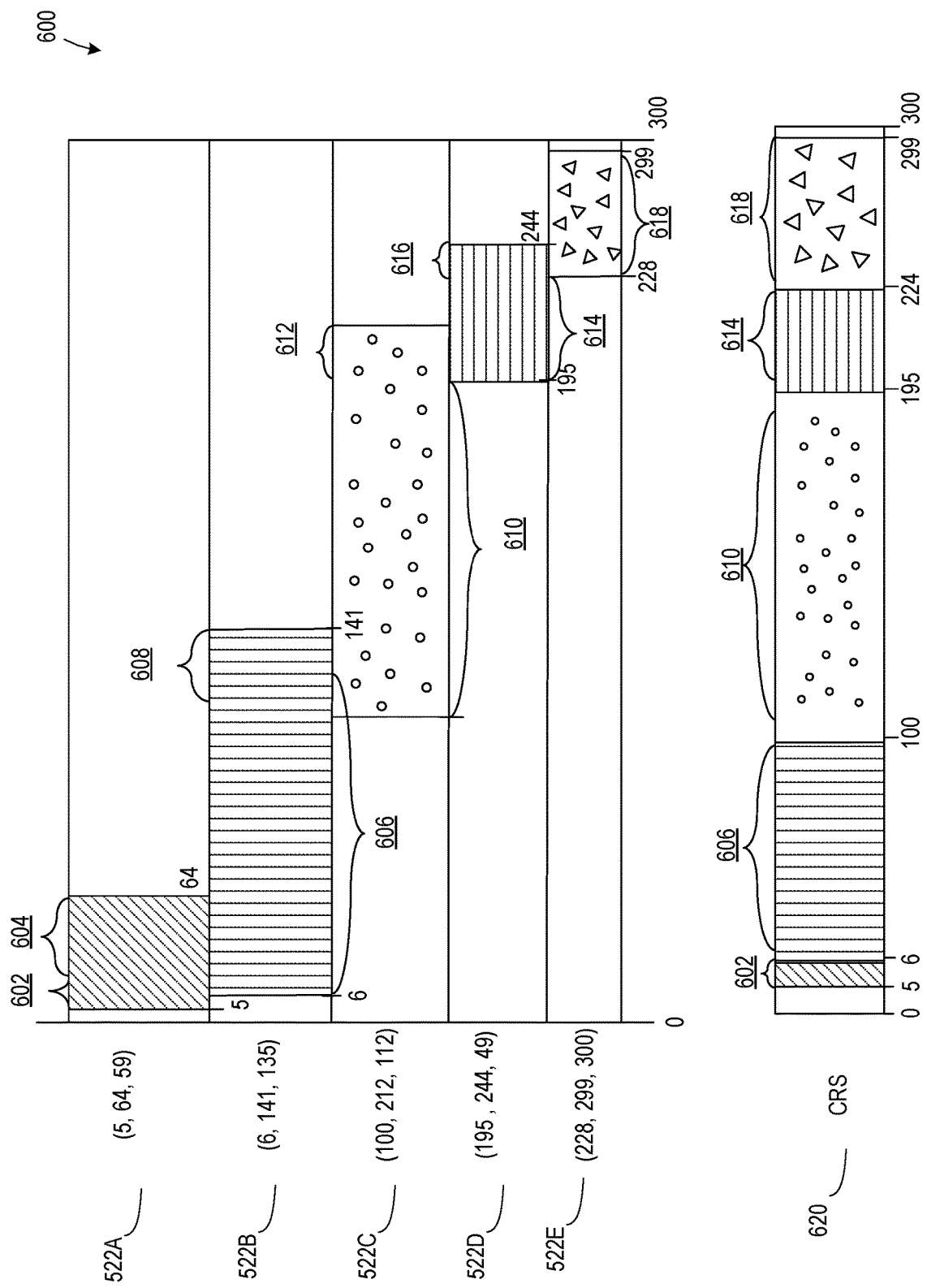
FIG. 6 illustrates an example signature stitching technique that may be implemented by the example reference signature asset generation system of FIG. 2.

The process in which the example path finder circuitry attempts to find a valid path is explored in more detail in FIG. 6. If a valid path is found, the subset of matched signature fragments and the ordering of the subset are provided to the example fragment stitcher circuitry 216. The example path finder circuitry 214 provides any matched signature fragment in the group that was not used in the valid path to the example fragment grouper circuitry 210, which returns the fragment to the example available fragment database 212 (e.g., without updating its usage index). Additionally, if a valid path is found, any matched signature fragment in the path that is available for re-use will have an updated index stored by the path finder circuitry 214 in the example available fragment database 212. In some examples, the example path finder circuitry 214 may find a single matched signature fragment that meets the path percentage threshold with the media and is continuous. In some such examples, the single matched signature fragment is itself a valid path.

The example path finder circuitry 214 may find multiple valid paths using a given group of matched signature fragments 204 and provide the valid paths to the fragment stitcher circuitry 216. While the fragment stitcher circuitry 216 may operate on each valid path it receives from the example path finder circuitry 214, the following explanation focuses on a single valid path, referred to as "the valid path" for convenience. In some examples, the fragment stitcher circuitry 216 operates on multiple valid paths in parallel. In some examples, the fragment stitcher circuitry 216 operates on each valid path sequentially.

In some examples, the example reference signature asset generation system 112 includes means for selecting a subset of matched signature fragments from the group to form a path of matched signature fragments that collectively represent a continuous segment of the piece of media. For example, the means for selecting may be implemented by the example path finder circuitry 214. In some examples, the example path finder circuitry 214 may be implemented by machine executable instructions such as that implemented by at least blocks 402-424 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the example path finder circuitry 214 is implemented by other hardware logic circuitry, hardware implemented state machines, and/or any other combination of hardware, software, and/or firmware. For example, the example path finder circuitry 214 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example, the fragment stitcher circuitry 216 of FIG. 2 receives the valid path. In some examples, the valid path includes multiple matched signature fragments 204 that are ordered. In these examples, the example fragment stitcher circuitry 216 then combines the matched signature fragments together, using the order given in the path, to form a reference signature asset. The example fragment stitcher circuitry 216 provides the formed reference signature asset to the data provider circuitry 218. In some examples, the valid path includes a singular matched signature fragment 204. In these examples, the singular matched signature fragment 204 is itself a reference signature asset, and the fragment stitcher circuitry provides it to the data provider circuitry 218 without any stitching. As used herein, the process used to form a reference signature asset from multiple signature fragments may also be referred to as a "stitching procedure", "procedure of stitching", or any alternative combination of these terms.

An example stitching procedure to form a reference signature asset from multiple matched signature fragments is described in U.S. patent application Ser. No. 17/331,603, (now U.S. Pat. No. 11,463,787) which was filed on May 26, 2021. U.S. patent application Ser. No. 17/331,603 is hereby incorporated herein by reference in its entirety. For completeness, FIG. 6 describes an example data set to illustrate an example stitching procedure that may be used by the fragment stitcher circuitry of FIG. 2.

In some examples, the example reference signature asset generation system 112 includes means for using a path to combine a subset of matched signature fragments and create a reference signature asset. For example, the means for using may be implemented by the fragment stitcher circuitry 216. In some examples, the fragment stitcher circuitry 216 may be implemented by machine executable instructions such as that implemented by at least blocks 316 of FIG. 3 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the fragment stitcher circuitry 216 is implemented by other hardware logic circuitry, hardware implemented state machines, and/or any other combination of hardware, software, and/or firmware. For example, the fragment stitcher circuitry 216 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example data provider circuitry 218 accepts reference signature assets from the fragment stitcher circuitry 216. The example data provider circuitry 218 then provides the reference signature assets to the example central facility 118 via the network 120. At the example central facility 118, an example AME may use the reference signature asset for generating ratings or for other analysis.

In some examples, the example reference signature asset generation system 112 includes means for providing data. For example, the means for providing may be implemented by the example data provider circuitry 218. In some examples, the example data provider circuitry 218 may be implemented by machine executable instructions such as that implemented by at least blocks 424 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the example data provider circuitry 218 is implemented by other hardware logic circuitry, hardware implemented state machines, and/or any other combination of hardware, software, and/or firmware. For example, the example data provider circuitry 218 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example reference signature asset generation system 112 both identifies singular matched signature fragments 204 that can be used as a reference signature asset and forms new reference signature assets by stitching multiple matched signature fragments 204 together. A reference signature asset that is formed by stitching multiple signature fragments together may not be available using previous techniques, so environments that use the example reference signature asset generation system 112 may be able to form more reference signature assets more quickly than prior systems.

While an example manner of implementing the example reference signature asset generation system 112 of FIG. 1 is illustrated in FIG. 2, one or more of the elements, processes, and/or devices illustrated in FIG. 2 may be combined, divided, re-arranged, omitted, eliminated, and/or implemented in any other way. Further, the example signature comparator circuitry 202, example fragment grouper circuitry 210, example path finder circuitry 214, example fragment stitcher circuitry 216, data provider circuitry 218, and/or, more generally, the example reference signature asset generation system 112 of FIG. 1, may be implemented by hardware, software, firmware, and/or any combination of hardware, software, and/or firmware. Thus, for example, any of the example signature comparator circuitry 202, example fragment grouper circuitry 210, example path finder circuitry 214, example fragment stitcher circuitry 216, data provider circuitry 218, and/or, more generally, the example reference signature asset generation system 112 of FIG. 1 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example s signature comparator circuitry 202, example fragment grouper circuitry 210, example path finder circuitry 214, example fragment stitcher circuitry 216, data provider circuitry 218, and/or, more generally, the example reference signature asset generation system 112 of FIG. 1 is/are hereby expressly defined to include a non-transitory computer readable storage device or storage disk such as a memory, a digital versatile disk (DVD), a compact disk (CD), a Blu-ray disk, etc., including the software and/or firmware. Further still, the example reference signature asset generation system 112 of FIG. 1 may include one or more elements, processes, and/or devices in addition to, or instead of, those illustrated in FIG. 2, and/or may include more than one of any or all of the illustrated elements, processes and devices.

Figure 3:
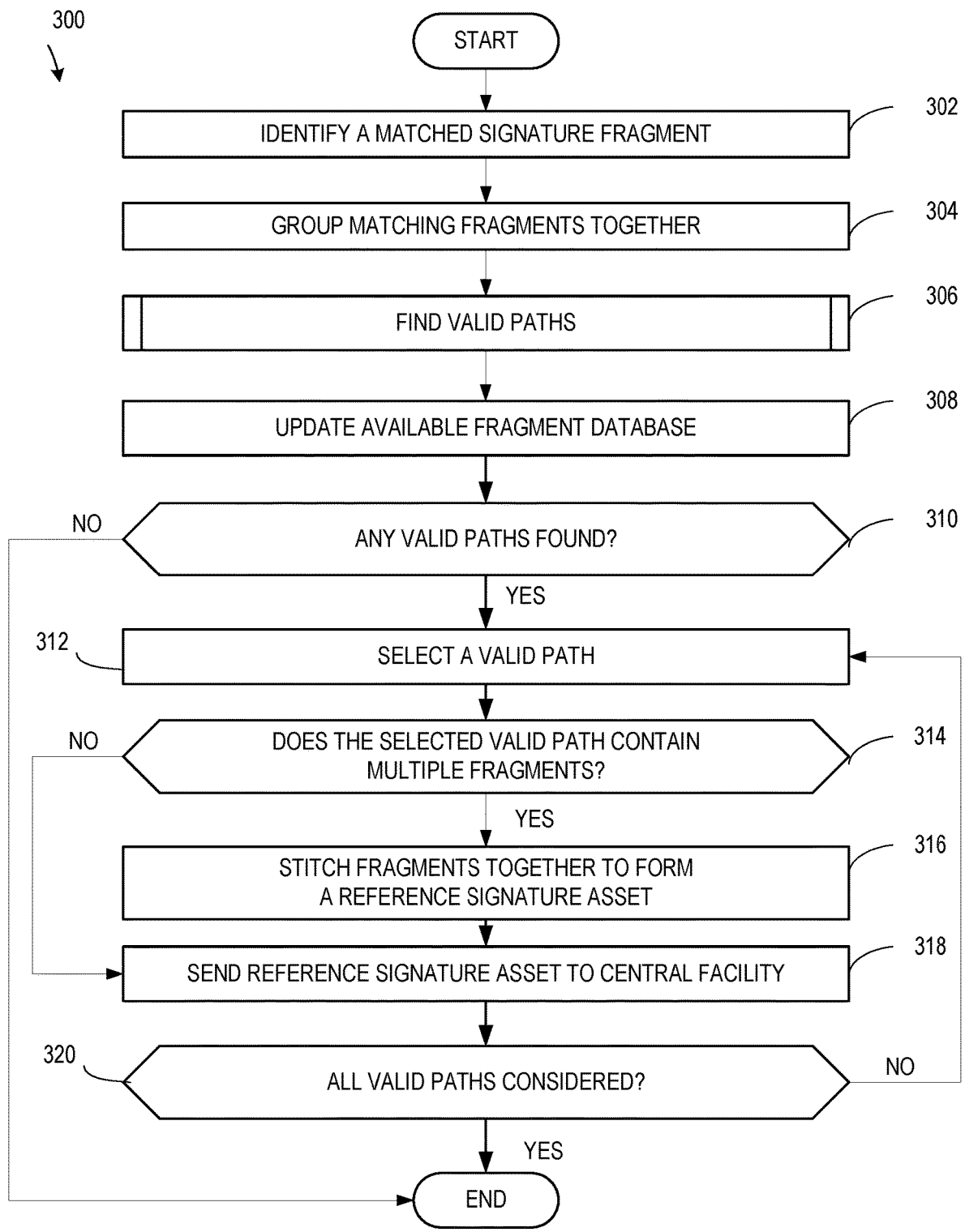
FIGS. 3-4 are flowcharts representative of example machine readable instructions that may be used to implement the example reference signature asset generation system of FIG. 2.
Figure 4:
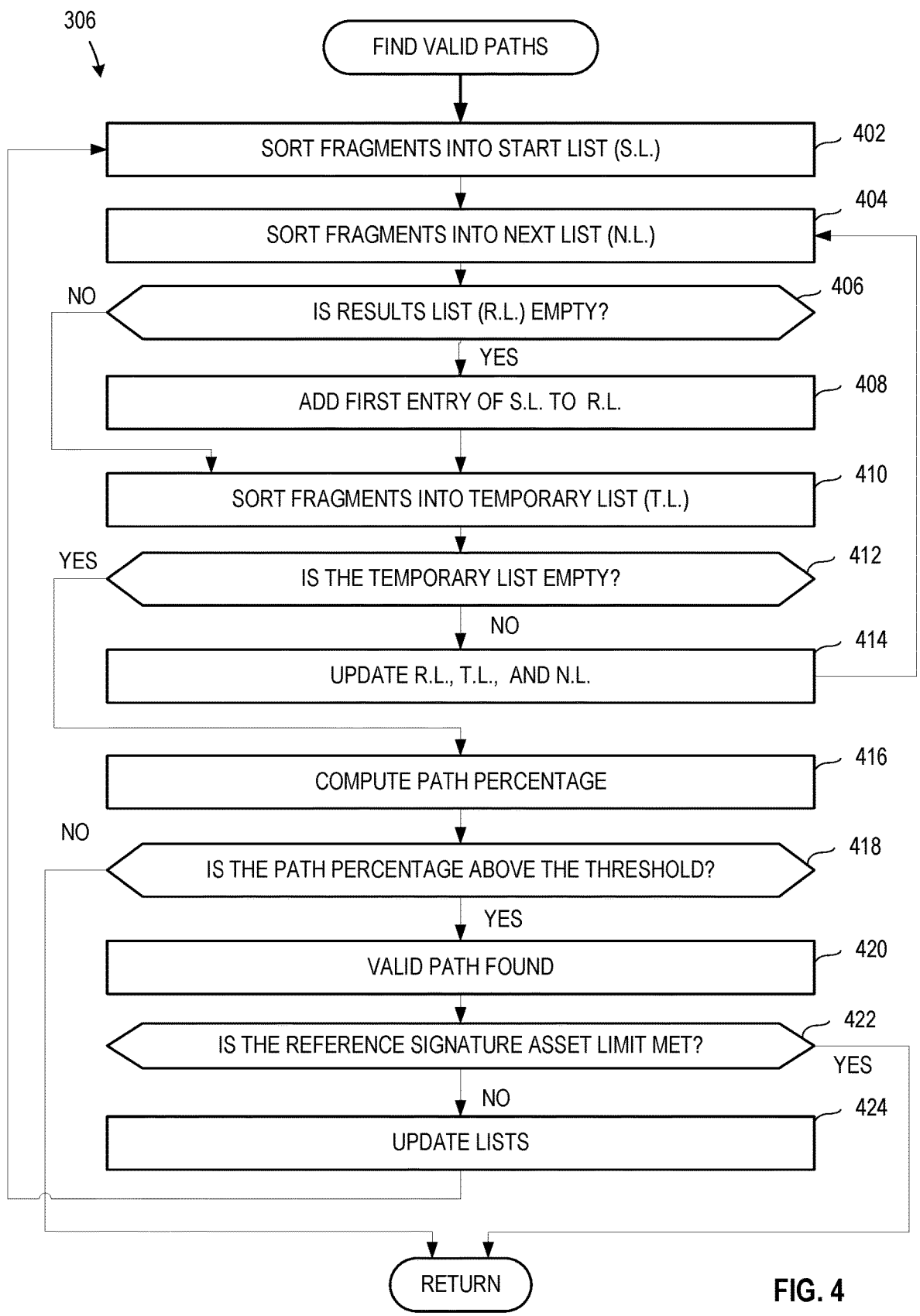

A flowchart representative of example hardware logic circuitry, machine readable instructions, hardware implemented state machines, and/or any combination thereof for implementing the example reference signature asset generation system 112 of FIG. 1 is shown in FIGS. 3, 4. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 3, 4, many other methods of implementing the example reference signature asset generation system 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 3,4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions that may be executed by example processor circuitry to implement the example reference signature asset generation system 112 of FIG. 1. The example process 300 begins with the signature comparator circuitry 202 identifying a matched signature fragment 204 (block 302). The example signature comparator circuitry 202 makes this identification by comparing signature sequences/strings from the meter signature database 122 against signature sequences/strings from the search signature database 124. As discussed previously, the signature comparator circuitry 202 also identifies media metadata 206 and fragment metadata 208 associated with the matched signature fragment 204.

The example fragment grouper circuitry 210 uses the example available fragment database 212 to form a group of matched signature fragments 204 with the same media metadata 206 (block 304). For example, received signature fragments that match to Season 1, Episode 1 of a show would be included in one group, while received signature fragments that match to Season 1, Episode 2 of the same show would be included in another group. Similarly, different movies, musicals, comedy specials, etc., represented in the received signature fragments would have their own group(s).

The example path finder circuitry finds valid paths that exist within the group (block 306). An example process for finding a valid path at block 306 is explored further in FIG. 4.

Once the valid paths have been found by the example process 306, the example fragment grouper circuitry 210 updates the example available fragment database 212 (block 308). In some examples, the AME sets a limit to the number of reference signature assets that should be formed for a given media. If the example path finder circuitry 214 did not meet the limit when finding the valid paths as described in block 306, then the example fragment grouper circuitry 210 stores any matched signature fragment 204 from the group that was not used to form a valid path. This is because if more matched signature fragments 204 with the same media metadata 206 are identified by the signature comparator circuitry 202 in the future, the example reference signature asset generation system 112 may be able to use these available fragments in combination with the new fragments to make a new reference signature asset Alternatively, if a limit is met when finding the valid paths as described in block 306, the example fragment grouper circuitry 210 removes and discards any signature fragment from the example available fragment database 212 that matches the given media. This is because no further reference signature assets are needed for that specific media, so storing matched signature fragments 204 of that media is also no longer necessary.

The example fragment stitcher circuitry 216 checks if any valid paths have been found (block 310). If no valid paths have been found, the example process 300 ends. If one or more valid paths have been found, a valid path is selected (block 312).

The example fragment stitcher circuitry 216 checks if the valid path contains multiple fragments (block 314). If the valid path does contain multiple fragments, the example fragment stitcher circuitry 216 stitches the multiple fragments together to form a reference signature asset (block 316). The data provider circuitry 218 then provides the reference signature asset to the central facility 118 (block 318). If the single valid path does not contain multiple fragments, the single fragment is already considered a reference signature asset and the data provider circuitry 218 provides it to the central facility 118 (block 318).

The example fragment stitcher circuitry 216 determines if all valid paths have been considered (block 320). If all valid paths have been considered, the example process 300 ends. If all valid paths have not been considered, the example process continues when the example fragment stitcher circuitry 216 selects a new valid path that has not been considered before (block 312). This process will repeat until all valid paths are converted or identified as reference signature assets, and all reference signature assets are provided to the central facility 118.

FIG. 4 is a flowchart representative of example machine readable instructions that may be executed by example processor circuitry to find all valid paths as described in FIG. 3. The example process 306 of FIG. 4 begins when the example path finder circuitry 214 sorts the matched signature fragments from the group of block 304 into a Start List (block 402). In some examples, the path finder circuitry 214 sorts the Start List by the fragment start time from the session metadata in ascending order, and then by length in descending order. In some examples, the path finder circuitry 214, determines the length of a matched signature fragment by subtracting the associated fragment start time from the associated fragment end time.

The example path finder circuitry 214 then sorts the matched signature fragments from the received group into a Next List (block 404). The Next List is sorted first by length in descending order, and then by fragment start time from the session metadata in ascending order.

The example path finder circuitry 214 determines if a Results List is currently empty (block 406). The Results List is empty when the example process 300 begins. If the Results List is currently empty, the example path finder circuitry 214 adds the first signature fragment of the Start List to the Results List (block 408). If the Results List is not currently empty, the example process 306 skips block 408.

The example path finder circuitry 214 forms a Temporary List using the Next List and the Start List (block 410). In some examples, the example path finder circuitry 214 checks each matched signature fragment on the Next List to the last matched signature fragment of the Result List against a first set of conditions. The first set of condition states that the fragment start time of the Next List fragment in question is to be at least 15 seconds later than the fragment start time of the Result List fragment, that the fragment start time of the Next List fragment in question is to be at least 15 seconds earlier than the fragment end time of the Result List fragment, and that the fragment end time of the Next List fragment in question is to be greater than the fragment end time of the Result List fragment. If a matched signature fragment 204 meets the first set of conditions, the example path finder circuitry 214 places a copy of the matched signature fragment from the Next List to the Temporary List.

If there are no fragments that meet the first set of conditions, the example path finder circuitry 214 checks each matched signature fragment on the Next List to the first entry of the Start List against a second set of conditions. The second set of condition states that the fragment start time of the Next List fragment in question is to be later than the fragment start time of the Start List entry, that the fragment start time of the Next List fragment in question is to be earlier than the fragment end time of the Start List entry, and that the fragment end time of the Next List fragment in question is to be greater than the fragment end time of the Start List entry. If a matched signature fragment 204 meets the second set of conditions, the example path finder circuitry 214 places a copy of the matched signature fragment from the Next List to the Temporary List. The example path finder circuitry 214 does not update the Temporary List if the matched signature fragments in the Next List fail to meet either set of conditions.

The example path finder circuitry 214 checks to see if the Temporary List is empty (block 412). If the Temporary List is not empty, then the example path finder circuitry 214 updates the Results List and the Next List (block 414). To update the Results List, the example path finder circuitry 214 copies the first matched signature fragment 204 of the Temporary List to the Results List. The newly added matched signature fragment 204 may be referred to as the "last" entry in the Results List until another matched signature fragment 204 is added.

To update the Temporary List, the example path finder circuitry 214 checks to see if the matched signature fragment 204 that was copied to the Results List is available for re-use. If the first matched signature fragment of the Temporary List is available for re-use, the example path finder circuitry 214 updates the re-use index and keeps the matched signature fragment on the Next List. If the first matched signature of the Temporary List is not available for re-use, the example path finder circuitry 214 removes the entry from the Next List.

The example path finder circuitry removes all copies from the Temporary List. Once the Result List, Temporary List, and Next List are updated (block 414), the example process 306 continues at block 404 by resorting the remaining matched signature fragments in the Next List first by length in descending order, and then by fragment start time from the session metadata in ascending order.

In the example process 306 of FIG. 4, a matched signature fragment can be re-used up to three times if its fragment start time is less than 60 seconds into the media, or if its fragment end time is no more than 60 seconds before the end time of the media. For example, a matched signature fragment 204 for the movie Frozen® with a fragment end time of 6490 seconds could be re-used up to three times, because the run time of Frozen® totals 6540 seconds. While a matched signature fragment 204 could be used only once to ensure the new reference signature assets are unique and different from one another, in some examples, a fragment with a fragment start time less than 60 seconds into the media, or a fragment end time that is no more than 60 seconds before the end time of the media, may be reused because such fragments are relatively rare. The re-usable matched signature fragments include the very beginning and very end of media, which often contains theme songs, title cards, credits, etc., and therefore are likely to be skipped by viewers.

In some examples, the example path finder circuitry 214 checks to see if the Temporary List is empty (block 412), and the Temporary List is empty. In this case, the example path finder circuitry 214 computes a path percentage (block 416).

The path percentage is computed by dividing the total length of the path by the total length of the media, where the total length of the path is defined as the difference between the fragment end time of the last signature fragment in the Results List and the fragment start time of the first signature fragment in the Results List.

The example path finder circuitry 214 determines if the path percentage meets a threshold (block 418). If the path percentage does not meet the threshold, the example process 306 of FIG. 4 ends and the example process 300 of FIG. 3 resumes. This is because the example process 306 produced reference signature assets in decreasing order of path percentage. Therefore, if a path is generated that does not meet the threshold, there are no more valid paths to be found from the remaining matched signature fragments. However, if the path percentage does meet the threshold, a valid path has been found (block 420).

The example path finder circuitry 214 checks to see if the reference signature asset limit has been met (block 422). If the reference signature asset limit has been met, the example process 306 of FIG. 4 ends and the example process 300 of FIG. 3 resumes.

If the reference signature asset limit has not been met, the example path finder circuitry 214 updates all lists (block 424). This includes emptying the Start, Next, and Temporary List, as well as creating a new Results List. Additionally, any fragment that is included in the previous Results List is removed from the received group of signature fragments so they cannot be included in the new Results List. The only exception to this are fragments that qualify for re-use. While the qualifications for re-use may vary by example, the conditions for re-use in the example process 306 are described above. The example process then continues by repopulating the Start List with the remaining signature fragments in the group of block 304.

Figure 5:
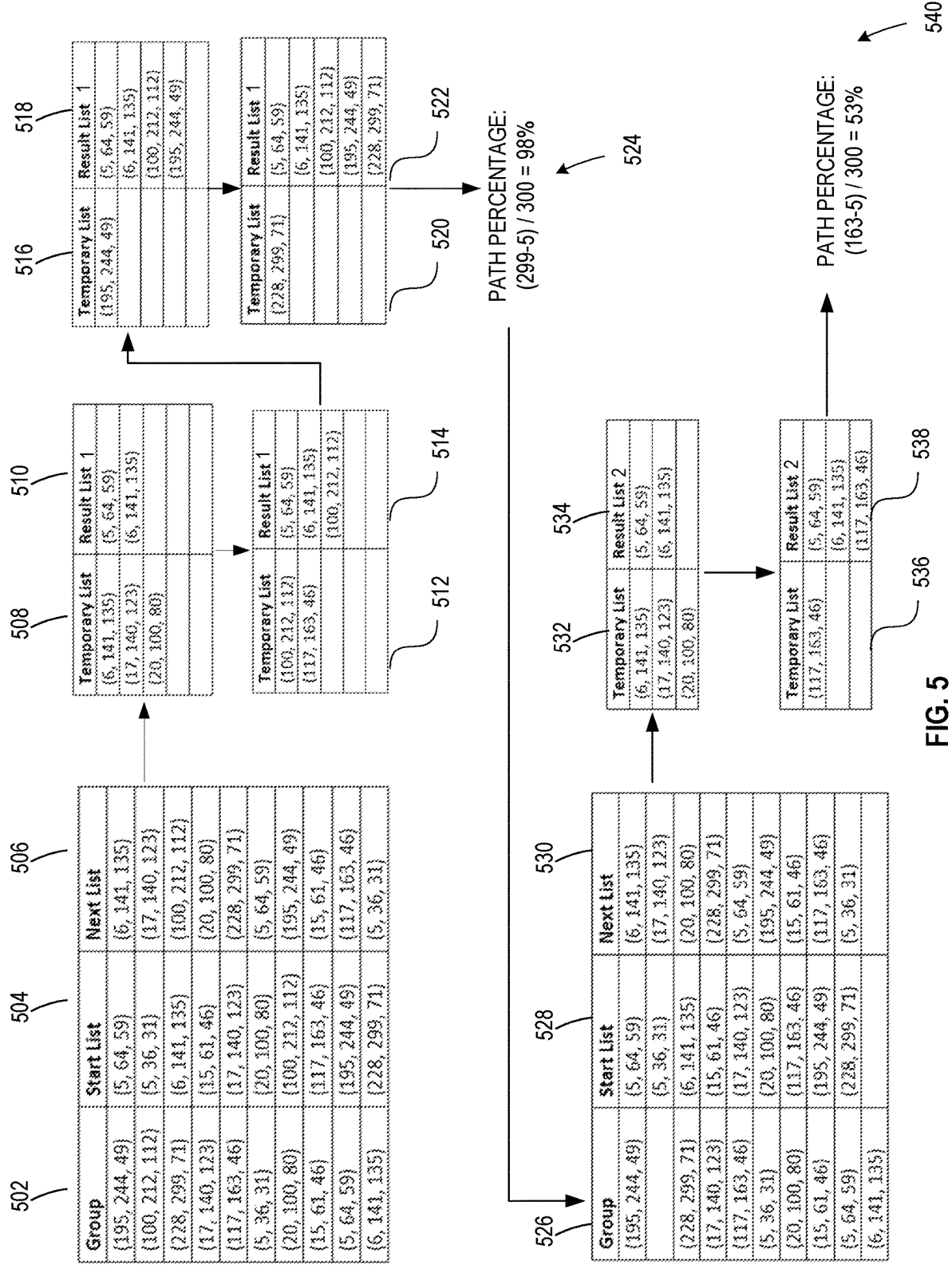
FIG. 5 illustrates an example path finding technique that may be implemented by the example reference signature asset generation system of FIG. 2.

FIG. 5 is an example data set to illustrate a path finding technique that may be implemented by the example path finder circuitry 214 of FIG. 2. The example group 502 of FIG. 5 includes matched signature fragments 204 associated with a hypothetical piece of media that is 5 minutes (or 300 seconds) in length. FIG. 5 uses a hypothetical media length of 5 minutes for simplicity. In practice, a piece of media may have shorter or longer run times. The example group 502 shows a column of ordered triplets, where each ordered triplet represents the fragment metadata 208 of a matched signature fragment 204 in the group. Each matched signature fragment 204 in the group 502 has the same media metadata as the hypothetical media. The fragment metadata 208 is represented in FIG. 4 using the following format: (fragment start time, fragment end time, fragment length) with units of seconds. While each fragment metadata 208 also has a corresponding a matched signature fragment 204 and media metadata 206, only the fragment metadata 208 are shown for simplicity.

The example path finder circuitry 214 takes the example group 502 and forms a Start List 504. The Start List is formed according to the rules described above in 402.

The example path finder circuitry 214 takes the example group 502 and forms a Next List 506. The Next List is formed according to the rules described above in 404.

The example path finder circuitry 214 updates the Temporary List as shown in table 508 and updates Results List 1 as shown in table 510. First, the example path finder circuitry 214 fragment (5, 64, 59) is added from the top of the Start List 504 to Results List as shown in 510 because the Results List was previously empty. Then, the example path finder circuitry 214 populates the Temporary List as shown in table 508. Because there are no matched signature fragments in the Next List 506 that meet the first set of conditions described above in connection with block 410, the example path finder circuitry 214 instead populates the Temporary List with three signature fragments that meet the second set of conditions described in connection with block 410. Finally, the example path finder circuitry 214 sorts the Temporary List as shown in table 508 and adds the signature fragment at the top, (6, 141, 135), to Results List 1 as shown in table 510.

At a second iteration, the example path finder circuitry 214 updates the Temporary List as shown in table 512 and updates Results List 1 as shown in table 514. In the second iteration, there are two signature fragments in the Next List 506 that meet the first set of conditions described in connection with block 410. The example path finder circuitry 214 adds the two signature fragments to the Temporary List and sorts the list as shown in table 512. The example path finder circuitry 214 adds the top entry from the list (100, 212, 112) to the bottom of the Results List 1 as shown in table 514.

At a third iteration, the example path finder circuitry 214 updates the Temporary List as shown in table 516 and updates Results List 1 as shown in table 518. In the third iteration, only one signature fragment in the Next List 506 meets the first set of conditions described in connection with block 410. The example path finder circuitry 214 adds the signature fragment (195, 244, 49) to the Temporary List as shown in table 516 and to the bottom of the Results List 1 as shown in table 518.

At a fourth iteration, the example path finder circuitry 214 updates the Temporary List as shown in table 520 and updates Results List 1 as shown in table 522. In the fourth iteration, only one signature fragment in the Next List 506 meets the first set of conditions described in connection with block 410. The example path finder circuitry 214 adds the signature fragment (228, 299, 71) to the Temporary List as shown in table 520 and to the bottom of the Results List 1 as shown in table 522.

The example path finder circuitry 214 determines that no additional signature fragments that meet either condition described in connection with block 410 after the fourth iteration. Therefore, the example path finder circuitry 214 computes a path percentage, shown by example operation 524. The example path finder circuitry 214 takes the segment end time (299) of the last signature fragment in the path and subtracts the example start time (5) of the first signature fragment in the path to obtain the length of the continuous segment in Results List 1, which is 294 seconds. The example path finder circuitry 214 divides the length of the continuous segment in Results List 1 as shown in table 522 (which is 294 seconds) by the length of the hypothetical media (which is 300 seconds). The resulting value, 98%, passes the example threshold of 95% used by the example data set in FIG. 5. Therefore, Results List 1 as shown in table 522 is sent to the example fragment stitcher circuitry 216 and the example path finder circuitry 214 finds another path.

Before the example path finder circuitry 214 finds another path, fragments not available for re-use listed in Results List 1 as shown in table 522 are removed from the group. Signature fragments (5, 64, 59) and (6, 141, 135) qualify for re-use because their fragment start time is less than 60 seconds, as a result, their re-use index is updated to 1 and they stay in the updated group 526. Similarly, signature fragments (195, 244, 49) and (228, 299, 71) qualify for re-use because their fragment end time is less than 60 seconds before the fragment end time of the media (300 seconds). Therefore, the example path finder circuitry 214 updates the re-use indices of the re-used signature fragments and keeps the re-used signature fragments in the updated group. As a result, only signature fragment (100, 212, 112) is removed from the updated group 526 and discarded. Because various media typically have runtimes longer than 5 minutes, in some examples, more than one signature fragment may be removed from example data sets used by the example path finder circuitry 214.

The example path finder circuitry 214 takes the updated group 526 and forms a Start List 528. The Start List is formed according to the rules described above in 402.

The example path finder circuitry 214 takes the updated group 526 and forms a Next List 530. The Next List is formed according to the rules described above in connection with block 404.

The example path finder circuitry 214 updates the Temporary List as shown in table 532 and updates Results List 2 as shown in table 534. First, the example path finder circuitry 214 adds the fragment (5, 64, 59) the top of the Start List 528 to Results List 2 as shown in table 534 because the Results List 2 was previously empty. Then, the example path finder circuitry 214 populates the Temporary List as shown in table 532. Because there are no signature fragments in the Next List 530 that meet the first set of conditions described in connection with block 410, the example path finder circuitry 214 instead populates the Temporary List with three matched signature fragments that meet the second set of conditions described in connection with block 410. Finally, the example path finder circuitry 214 sorts the Temporary List as described in 410 and the adds the signature fragment at the top, (6, 141, 135), to Results List 2 as shown in table 534.

In a second iteration, the example path finder circuitry 214 updates the Temporary List as shown in table 536 and updates Results List 2 as shown in table 538. Because the signature fragment (100, 212, 112) was used in Results List 1 and is not available for re-use, it is not listed in the updated group 526. As a result, the example path finder circuitry 214 adds the signature fragment (117, 163, 46) to the Temporary List as shown in table 536 and to the bottom of the Results List 2 as shown in table 538.

After the second iteration resulting in Results List 2 as shown in 538, the example path finder circuitry 214 finds that there are no signature fragments in the Next List 530 that meet the either set of conditions described in connection with block 406. Therefore, the example path finder circuitry 214 computes the path percentage for Results List 2 to be 53%, as shown in operation 540. Because 53% does not pass the path percentage threshold of 95% used in the example data set, Results List 2 is not a valid path and the example fragment stitcher circuitry 216 does not stitch Results List 2 together to form a reference signature asset. Further, the example path finder circuitry 214 does not discard or increment the re-use index of the matched signature fragments in Results List 2 as shown in table 538, because Results List 2 was not used to form a reference signature asset.

Because the example path finder circuitry 214 forms groups in descending path percentage, there are no additional valid paths to be found in the current group after finding Results List 2 as shown in table 538. The example fragment grouper circuitry 210 stores the matched signature fragments in the updated group 526 in the available fragment database 212. Note that matched signature fragments represented by the fragment metadata (5, 64, 69), (6, 141, 135), (195, 244, 49), and (228, 299, 71) are all stored with a re-use index set to 1.

FIG. 6 is an example data set to illustrate an example method of stitching that may be used by the fragment stitcher circuitry of FIG. 2. The example data set 600 refers to the signature fragments in Results List as shown in 522 of FIG. 5, which passed the path percentage threshold and can be considered a valid path. In the illustrated example, the data set includes example signature fragments 522A, 522B, 522C, 522D, 522E. Like the dataset of FIG. 5, the data set of FIG. 6 corresponds to a hypothetical media that is 300 seconds in length. Also like the data set in FIG. 5, the fragment metadata 208 are shown as an ordered triplet referring to (fragment start time, fragment end time, fragment length).

For the matched signature fragments in a valid path to form a continuous segment, some or all matched signature fragments may overlap one another. As a result, a signature fragment may be divided into sections. In this example, the first section of a signature fragment refers to the beginning of the fragment until the timestamp where the next signature fragment begins. The second section of a signature fragment refers to the timestamp where the next fragment begins until the end of the signature fragment. For example, the section 610 of signature fragment 522C is shown as the shaded section between 100 seconds and 195 seconds, which is where signature fragment 522C begins and signature fragment 522D begins respectively. The section 612 of signature fragment 522C is shown as the shaded section between 195 seconds and 212 seconds, which is where the signature fragment 522D begins and the signature fragment 522C ends, respectively.

In the example data set 600, the shaded sections 602-618 refer to the portion of the matched signature fragment that is associated to the media at the listed timestamps. If a given signature fragment does not have a next signature fragment (that is, if a given signature fragment is the last signature fragment in a valid path), the signature fragment may only have a single shaded section such as 618.

The example fragment stitcher circuitry 216 takes the first portion of the matched signature fragments, which are shaded sections 602, 606, 610, 614, 618, and appends the portions together in the order shown in FIG. 6 and listed above. In doing so, a new matched signature fragment 620 is formed. The matched new signature fragment 620 is described as (5, 299, 294) and is considered a reference signature asset. In some examples, alternative previous methods of stitching may be used to combine a subset of matched signature fragments that form a valid path into a reference signature asset.

Figure 7:
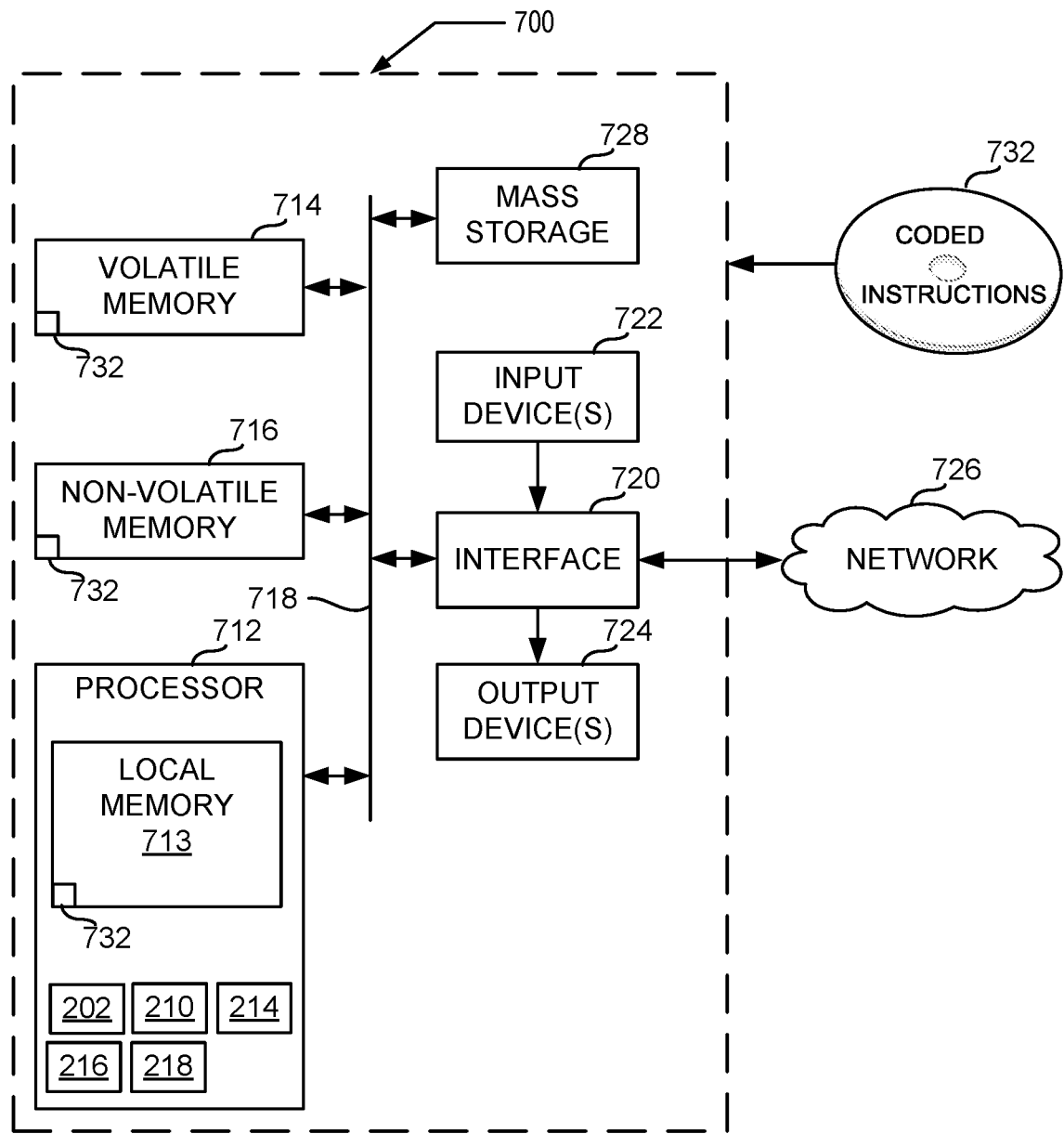
FIG. 7 is a block diagram of an example processing platform including processor circuitry structured to execute the example machine readable instructions of FIGS. 3, 4 to implement the example reference signature asset generation system of FIGS. 1, 2.

FIG. 7 is a block diagram of an example processor platform 700 structured to execute and/or instantiate the machine readable instructions and/or operations of FIGS. 3, 4 to implement the example reference signature asset generation system 112 of FIG. 1. The processor platform 700 can be, for example, a server, a personal computer, a workstation, a self-learning machine (e.g., a neural network), a mobile device (e.g., a cell phone, a smart phone, a tablet such as an iPad™), an Internet appliance, a set top box, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements signature comparator circuitry 202, example fragment grouper circuitry 210, example path finder circuitry 214, example fragment stitcher circuitry 216, and data provider circuitry 218.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIGS. 3,4 may be stored in the mass storage device 728, in the volatile memory 714, in the non-volatile memory 716, and/or on a removable non-transitory computer readable storage medium such as a CD or DVD.

Figure 8:
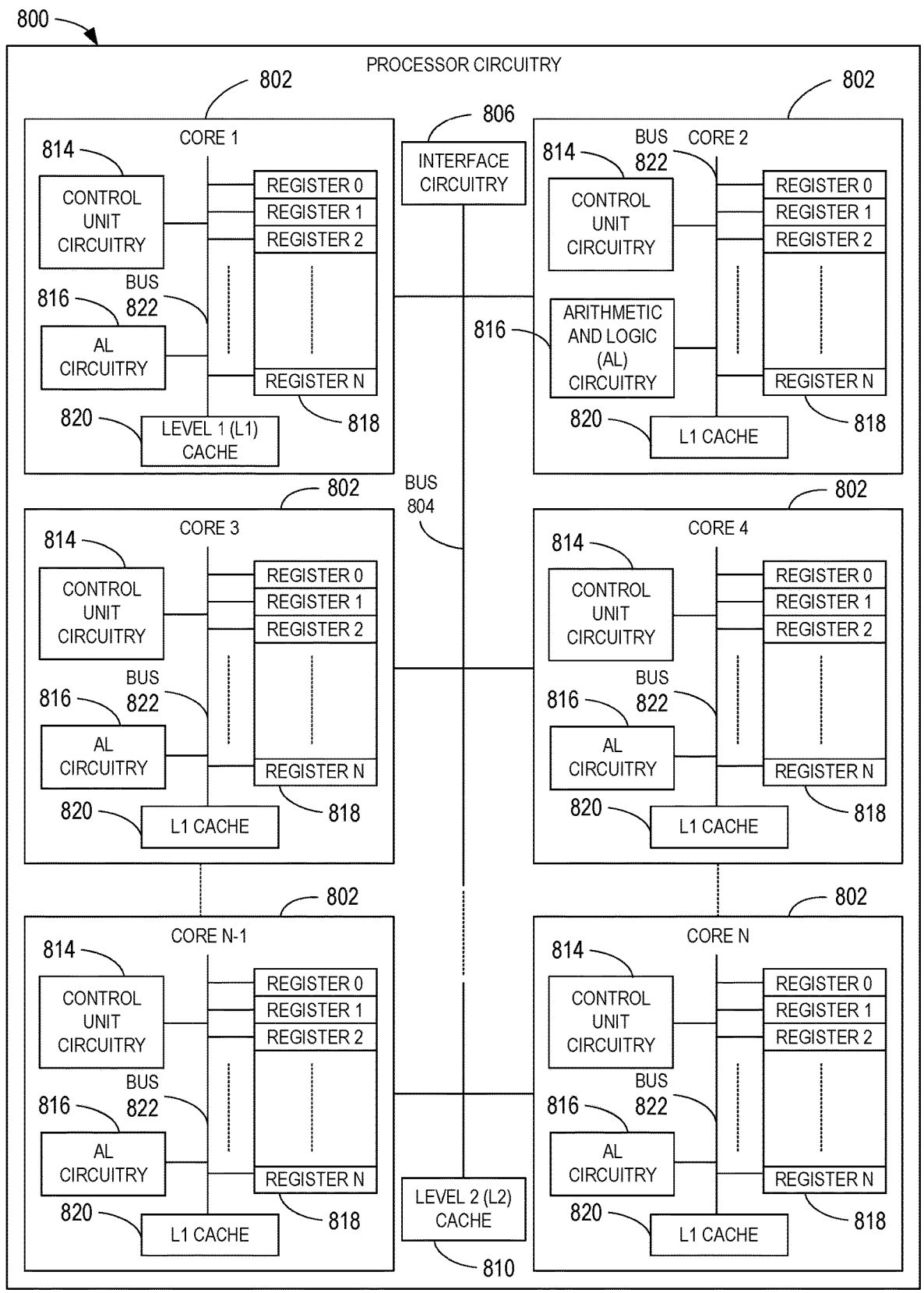
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 3,4.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_ cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
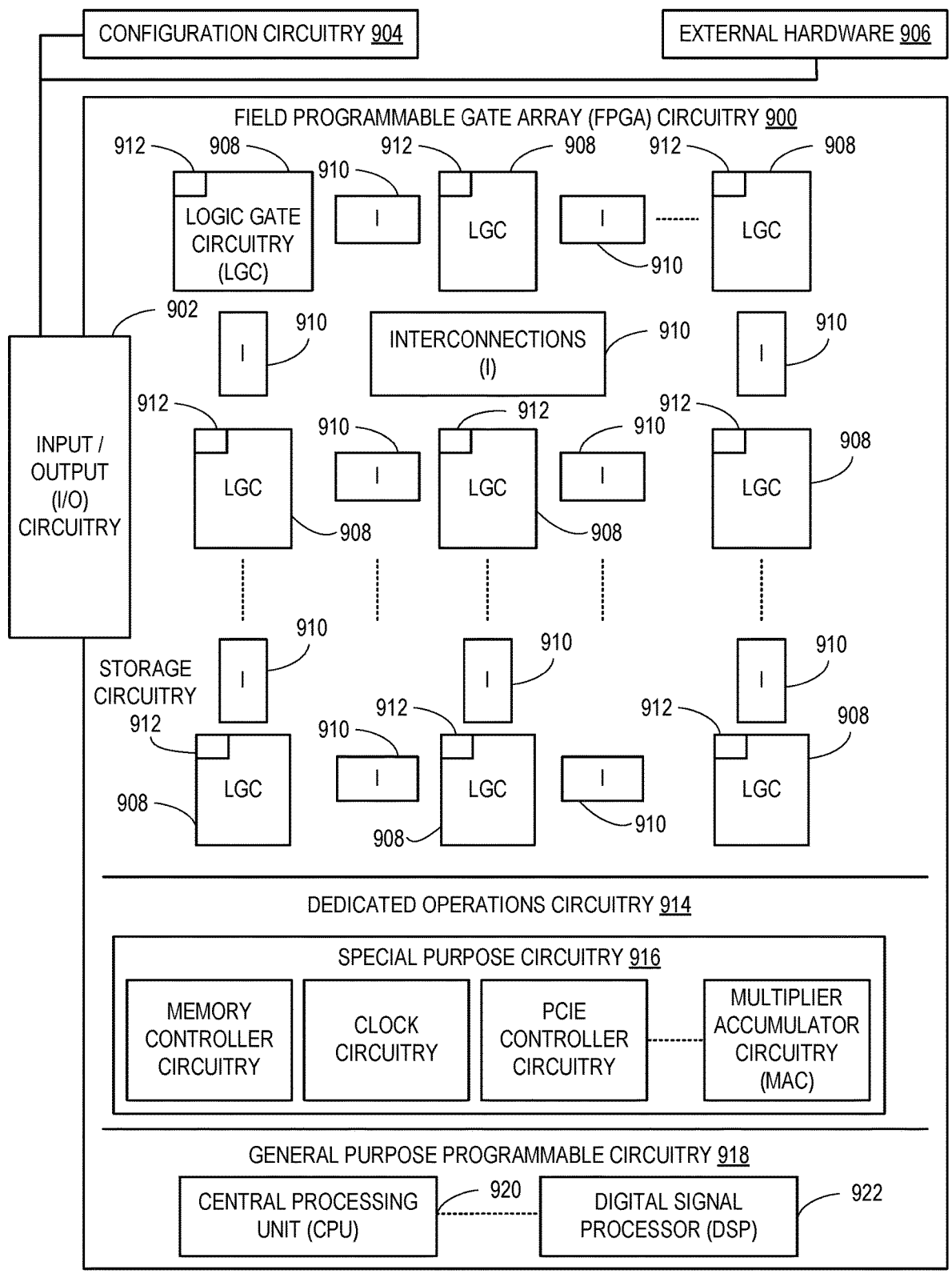
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 3, 4. but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 3, 4. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 3, 4. As such, the FPGA circuitry 900 may be structured to effectively instantiate some or all of the machine readable instructions of the flowcharts of FIGS. 3, 4 as dedicated logic circuits to perform the operations corresponding to those software instructions in a dedicated manner analogous to an ASIC. Therefore, the FPGA circuitry 900 may perform the operations corresponding to some or all of the machine readable instructions of FIG. 9 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 6, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 3,4 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 3,4 may be executed by one or more of the cores 802 of FIG. 8 and a second portion of the machine readable instructions represented by the flowcharts of FIGS. 3,4 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
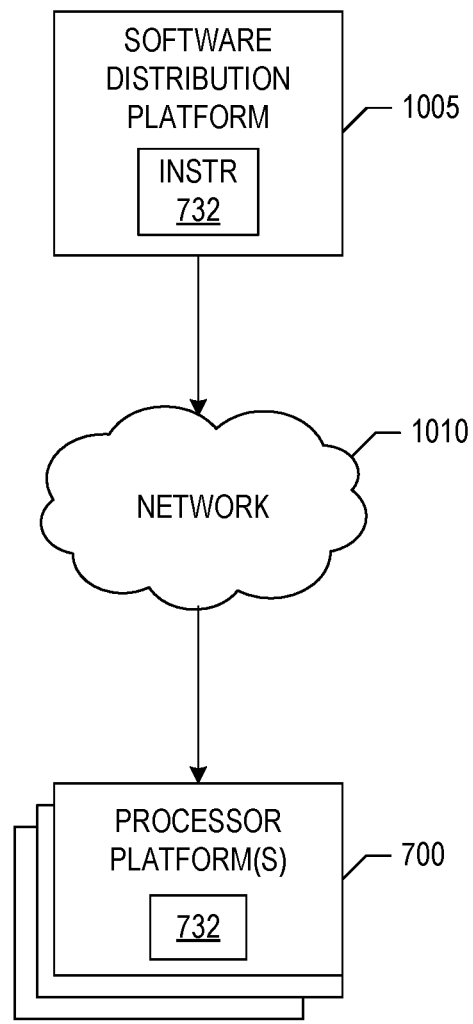
FIG. 10 is a block diagram of an example software distribution platform (e.g., one or more servers) to distribute software (e.g., software corresponding to the example machine readable instructions of FIGS. 3 and/or 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 302-320 and 402-420 of FIGS. 3,4 as described above. The one or more servers of the example software distribution platform 1005 are in communication with a network 1010, which may correspond to any one or more of the Internet and/or any of the example networks 120 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 302-320 and 402-420 of FIGS. 3,4, may be downloaded to the example processor platform 700, which is to execute the machine readable instructions 732 to implement the reference signature asset generation system 112. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that create a reference signature asset using multiple matched signature fragments. The disclosed systems, methods, apparatus, and articles of manufacture improve the efficiency of using a computing device by using signature fragments that may have been discarded in prior systems to form a reference signature asset, thereby producing reference signature assets more efficiently than such prior systems. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to create a reference signature asset are disclosed herein. Further examples and combinations thereof include the following. Example 1 includes an apparatus to create a create a reference signature asset from signature fragments, comprising memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate fragment grouper circuitry to form a group of matched signature fragments corresponding to a same piece of media, respective ones of the matched signature fragments to represent corresponding portions of the piece of media, path finder circuitry to select a subset of matched signature fragments from the group to form a path of matched signature fragments that collectively represent a continuous segment of the piece of media, the continuous segment identified by a segment start time and a segment end time, the segment start time corresponding to a fragment start time associated with an initial matched signature fragment in the path, the segment end time corresponding to a fragment end time associated with a last matched signature fragment in the path, and fragment stitcher circuitry to use the path to combine the subset of matched signature fragments and create a reference signature asset.

Example 2 includes the apparatus of example 1, wherein the path finder circuitry is to order the subset of matched signature fragments from the initial matched signature fragment to the last matched signature fragment to form the path.

Example 3 includes the apparatus of example 1, wherein the path finder circuitry is to determine whether a difference between the segment end time and the segment start time meets a threshold, provide the path to the fragment stitcher circuitry in response to a determination that the difference between the segment end time and the segment start time meets a threshold, and discard the path in response to a determination that the difference between the segment end time and the segment start time does not meet a threshold.

Example 4 includes the apparatus of example 1, wherein the subset is a first subset, the path is a first path, and the path finder circuitry is to select a different second subset of matched signature fragments from the group to form a second path of matched signature fragments.

Example 5 includes the apparatus of example 4, wherein the path finder circuitry is to include at least one matched signature fragment from the first subset in the different second subset of matched signature fragments.

Example 6 includes the apparatus of example 5, wherein the at least one matched signature fragment from the first subset is associated with a fragment start time a threshold amount of time from a start of the piece of media.

Example 7 includes the apparatus of example 5, wherein the matched signature fragment from the first subset is associated with a fragment end time within a threshold amount of time from an end of the piece of media.

Example 8 includes At least one non-transitory machine-readable medium comprising instructions that, when executed, cause at least one processor to at least form a group of matched signature fragments corresponding to a same piece of media, respective ones of the matched signature fragments to represent corresponding portions of the piece of media, select a subset of matched signature fragments from the group to form a path of matched signature fragments that collectively represent a continuous segment of the piece of media, the continuous segment identified by a segment start time and a segment end time, the segment start time corresponding to a fragment start time associated with an initial matched signature fragment in the path, the segment end time corresponding to a fragment end time associated with a last matched signature fragment in the path, and use the path to combine the subset of matched signature fragments and create a reference signature asset.

Example 9 includes the at least one non-transitory machine-readable medium of example 8, wherein the instructions cause the at least one processor to order the subset of matched signature fragments from the initial matched signature fragment to the last matched signature fragment to form the path.

Example 10 includes the at least one non-transitory machine-readable medium of example 8, wherein the instructions cause the at least one processor to determine whether a difference between the segment end time and the segment start time meets a threshold, retain the path in response to a determination that the difference between the segment end time and the segment start time meets a threshold, and discard the path in response to a determination that the difference between the segment end time and the segment start time does not meet a threshold.

Example 11 includes the at least one non-transitory machine-readable medium of example 8, wherein the subset is a first subset, the path is a first path, and the instructions cause the at least one processor to select a different second subset of matched signature fragments from the group to form a second path of matched signature fragments.

Example 12 includes the at least one non-transitory machine-readable medium of example 11, wherein the instructions cause the at least one processor to include at least one matched signature fragment from the first subset in the different second subset of matched signature fragments.

Example 13 includes the at least one non-transitory machine-readable medium of example 12, wherein the matched signature fragment from the first subset is associated with a fragment start time a threshold amount of time from a start of the piece of media.

Example 14 includes the at least one non-transitory machine-readable medium of example 12, wherein the matched signature fragment from the first subset is associated with a fragment end time within a threshold amount of time from an end of the piece of media.

Example 15 includes an apparatus for creating a reference signature asset from signature assets, the apparatus comprising means for forming a group of matched signature fragments corresponding to a same piece of media, respective ones of the matched signature fragments to represent corresponding portions of the piece of media, means for selecting a subset of matched signature fragments from the group to form a path of matched signature fragments that collectively represent a continuous segment of the piece of media, the continuous segment identified by a segment start time and a segment end time, the segment start time corresponding to a fragment start time associated with an initial matched signature fragment in the path, the segment end time corresponding to a fragment end time associated with a last matched signature fragment in the path, and means for using the path to combine the subset of matched signature fragments and create a reference signature asset.

Example 16 includes the apparatus of example 15, wherein the means for selecting is to order the subset of matched signature fragments from the initial matched signature fragment to the last matched signature fragment to form the path.

Example 17 includes the apparatus of example 15, wherein means for selecting is to determining whether a difference between the segment end time and the segment start time meets a threshold, retaining the path in response to a determination that the difference between the segment end time and the segment start time meets a threshold, and discarding the path in response to a determination that the difference between the segment end time and the segment start time does not meet a threshold.

Example 18 includes the apparatus of example 15, wherein the subset is a first subset, the path is a first path, and the means for selecting is to select a different second subset of matched signature fragments from the group to form a second path of matched signature fragments.

Example 19 includes the apparatus of example 18, wherein the means for selecting is to include at least one matched signature fragment from the first subset in the different second subset of matched signature fragments.

Example 20 includes the apparatus of example 19, wherein the matched signature fragment from the first subset is associated with a fragment start time less than a threshold amount of time from a start of the piece of media.

Example 21 includes the apparatus of example 19, wherein the matched signature fragment from the first subset is associated with a fragment end time within a threshold amount of time from an end of the piece of media.

Example 22 includes a method of creating reference signature assets from signature assets, the method comprising forming, by executing an instruction with at least one processor, a group of matched signature fragments corresponding to a same piece of media, respective ones of the matched signature fragments to represent corresponding portions of the piece of media, selecting, by executing an instruction with the at least one processor, a subset of matched signature fragments from the group to form a path of matched signature fragments that collectively represent a continuous segment of the piece of media, the continuous segment identified by a segment start time and a segment end time, the segment start time corresponding to a fragment start time associated with an initial matched signature fragment in the path, the segment end time corresponding to a fragment end time associated with a last matched signature fragment in the path, and using the path to combine the subset of matched signature fragments and create a reference signature asset.

Example 23 includes the method of example 22, wherein the selecting includes ordering the subset of matched signature fragments from the initial matched signature fragment to the last matched signature fragment to form the path.

Example 24 includes the method of example 22, wherein the selecting includes determining whether a difference between the segment end time and the segment start time meets a threshold, retaining the path in response to a determination that the difference between the segment end time and the segment start time meets a threshold, and discarding the path in response to a determination that the difference between the segment end time and the segment start time does not meet a threshold.

Example 25 includes the method of example 22, wherein the subset is a first subset, the path is a first path, and the selecting includes selecting a different second subset of matched signature fragments from the group to form a second path of matched signature fragments.

Example 26 includes the method of example 25, wherein the selecting involves including at least one matched signature fragment from the first subset in the different second subset of matched signature fragments.

Example 27 includes the method of example 26, wherein the at least one matched signature fragment from the first subset is associated with a fragment start time a threshold amount of time from a start of the piece of media.

Example 28 includes the method of example 26, wherein the matched signature fragment from the first subset is associated with a fragment end time within a threshold amount of time from an end of the piece of media.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing system to create a reference signature asset from signature fragments, the computing system comprising:
   a processor; and
   a non-transitory computer-readable storage medium, having stored thereon program instructions that, upon execution by the processor, cause performance of a set of operations to:
      sort a group of matched signature fragments into a first list by order of fragment start times and a second list by descending order of fragment lengths, the matched signature fragments corresponding to a same piece of media, respective ones of the matched signature fragments to represent corresponding portions of the piece of media;
      select a first signature fragment from the first list and a second signature fragment from the second list, the first signature fragment and the second signature fragment to overlap by a first threshold and to collectively represent a continuous segment of the piece of media; and
      in response to a determination that a difference between a segment end time of the second signature fragment and a segment start time of the first signature fragment meets a second threshold, combine the first signature fragment and the second signature fragment to create the reference signature asset.

2. The computing system of claim 1, wherein the operations further to select the second signature fragment from the second list in response to a determination that:
   a segment start time of the second signature fragment is a threshold amount of time later than the segment start time of the first signature fragment;
   the segment start time of the second signature fragment is a threshold amount of time before a segment end time of the first signature fragment; and
   a segment end time of the second signature fragment is after the segment end time of the first signature fragment.

3. The computing system of claim 1, wherein the operations further to select the second signature fragment from the second list in response to a determination that:
   a segment start time of the second signature fragment is after the segment start time of the first signature fragment;
   the segment start time of the second signature fragment is before a segment end time of the first signature fragment; and
   a segment end time of the second signature fragment is after the segment end time of the first signature fragment.

4. The computing system of claim 1, wherein:
   the reference signature asset is a first signature asset; and
   the operations further to form a third list from a subset of the group of matched signature fragments, the third list ordered to form a continuous segment of the piece of media, the subset to not include the second signature fragment.

5. The computing system of claim 4, wherein the operations further to:
   in response to a determination that a difference between a segment end time of a last signature fragment in the third list and a segment start time of an initial signature fragment in the third list meets the second threshold, combine the subset of the group of matched signature fragments in an order described by the third list to form a second reference signature asset; and in response to a determination that a difference between the segment end time of the last signature fragment in the third list and the segment start time of the initial signature fragment in the third list does not meet the second threshold, discard the third list.

6. The computing system of claim 4, wherein the third list includes the first signature fragment.

7. The computing system of claim 1, wherein;
the second list includes the second signature fragment and a third signature fragment;
the second signature fragment and the third signature fragment have a same fragment length; and
the operations further to sort the second signature fragment and the third signature fragment within the second list by fragment start time in ascending order.

8. A non-transitory computer-readable storage medium comprising instructions to cause programmable circuitry to at least:
sort a group of matched signature fragments into a first list by order of fragment start times and a second list by descending order of fragment lengths, the matched signature fragments corresponding to a same piece of media, respective ones of the matched signature fragments to represent corresponding portions of the piece of media;
select a first signature fragment from the first list and a second signature fragment from the second list, the first signature fragment and the second signature fragment to overlap by a first threshold and to collectively represent a continuous segment of the piece of media; and
in response to a determination that a difference between a segment end time of the second signature fragment and a segment start time of the first signature fragment meets a second threshold, combine the first signature fragment and the second signature fragment to create a reference signature asset.

9. The non-transitory computer-readable storage medium of claim 8, wherein the instructions cause the programmable circuitry to select the second signature fragment from the second list in response to a determination that:
a segment start time of the second signature fragment is a threshold amount of time later than the segment start time of the first signature fragment;
the segment start time of the second signature fragment is a threshold amount of time before a segment end time of the first signature fragment; and
a segment end time of the second signature fragment is after the segment end time of the first signature fragment.

10. The non-transitory computer-readable storage medium of claim 8, wherein:
the programmable circuitry is to select the second signature fragment from the second list in response to a determination that:
a segment start time of the second signature fragment is after the segment start time of the first signature fragment;
the segment start time of the second signature fragment is before a segment end time of the first signature fragment; and
a segment end time of the second signature fragment is after the segment end time of the first signature fragment.

11. The non-transitory computer-readable storage medium of claim 8, wherein:

the reference signature asset is a first signature asset; and
the instructions cause the programmable circuitry to form a third list from a subset of the group of matched signature fragments, the third list ordered to form a continuous segment of the piece of media, the subset to not include the second signature fragment.

12. The non-transitory computer-readable storage medium of claim 11, wherein the instructions cause the programmable circuitry to:
in response to a determination that a difference between a segment end time of a last signature fragment in the third list and a segment start time of an initial signature fragment in the third list meets the second threshold, combine the subset of the group of matched signature fragments in an order described by the third list to form a second reference signature asset; and
in response to a determination that a difference between the segment end time of the last signature fragment in the third list and the segment start time of the initial signature fragment in the third list does not meet the second threshold, discard the third list.

13. The non-transitory computer-readable storage medium of claim 11, wherein the third list includes the first signature fragment.

14. The non-transitory machine-computer-readable storage medium of claim 8, wherein:
the second list includes the second signature fragment and a third signature fragment;
the second signature fragment and the third signature fragment have a same fragment length; and
the programmable circuitry is to sort the second signature fragment and the third signature fragment within the second list by fragment start time in ascending order.

15. A method to create a reference signature asset from signature fragments, the method comprising:
sorting a group of matched signature fragments into a first list by order of fragment start times and a second list by descending order of fragment lengths, the matched signature fragments corresponding to a same piece of media, respective ones of the matched signature fragments to represent corresponding portions of the piece of media;
selecting a first signature fragment from the first list and a second signature fragment from the second list, the first signature fragment and the second signature fragment to overlap by a first threshold and to collectively represent a continuous segment of the piece of media; and
in response to a determination that a difference between a segment end time of the second signature fragment and a segment start time of the first signature fragment meets a second threshold, combining the first signature fragment and the second signature fragment to create the reference signature asset.

16. The method of claim 15, further including selecting the second signature fragment from the second list in response to a determination that:
a segment start time of the second signature fragment is a threshold amount of time later than the segment start time of the first signature fragment;
the segment start time of the second signature fragment is a threshold amount of time before a segment end time of the first signature fragment; and
a segment end time of the second signature fragment is after the segment end time of the first signature fragment.

17. The method of claim 15, further including selecting the second signature fragment from the second list in response to a determination that:
- a segment start time of the second signature fragment is after the segment start time of the first signature fragment;
- the segment start time of the second signature fragment is before a segment end time of the first signature fragment; and
- a segment end time of the second signature fragment is after the segment end time of the first signature fragment.

18. The method of claim 15, wherein:
the reference signature asset is a first signature asset; and
the method further includes forming a third list from a subset of the group of matched signature fragments, the third list ordered to form a continuous segment of the piece of media, the subset to not include the second signature fragment.

19. The method of claim 18, further including:
- in response to a determination that a difference between a segment end time of a last signature fragment in the third list and a segment start time of an initial signature fragment in the third list meets the second threshold, combining the subset of the group of matched signature fragments in an order described by the third list to form a second reference signature asset; and
- in response to a determination that a difference between the segment end time of the last signature fragment in the third list and the segment start time of the initial signature fragment in the third list does not meet the second threshold, discarding the third list.

20. The method of claim 18, wherein the third list includes the first signature fragment.

* * * * *